JAMES W. BROOK
TRANSPLANTER
No. 117378. Patented Jul 25 1871.
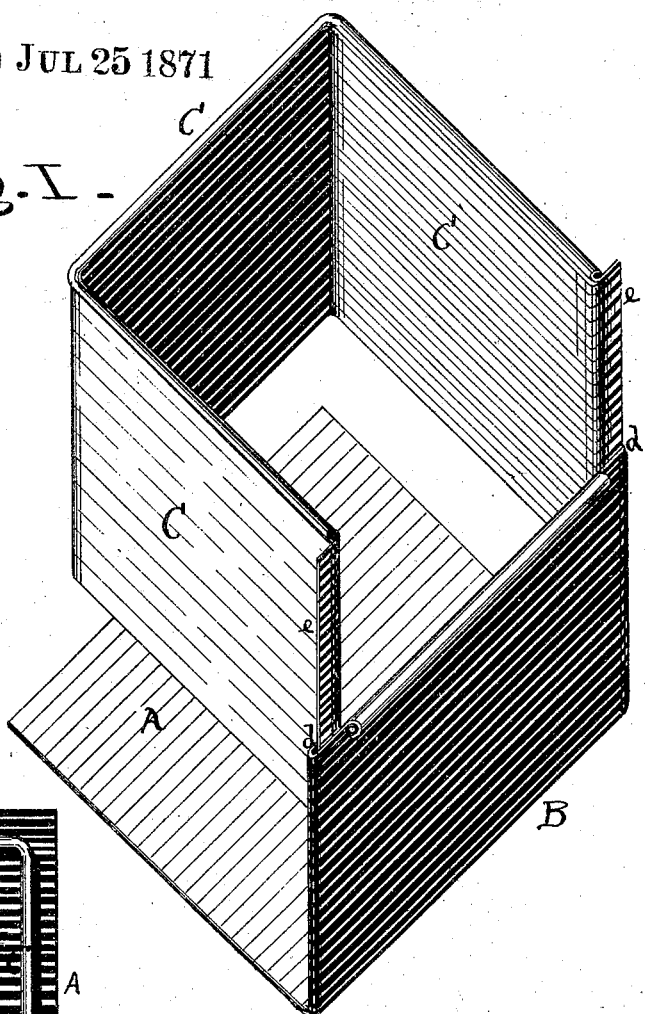
Fig. I
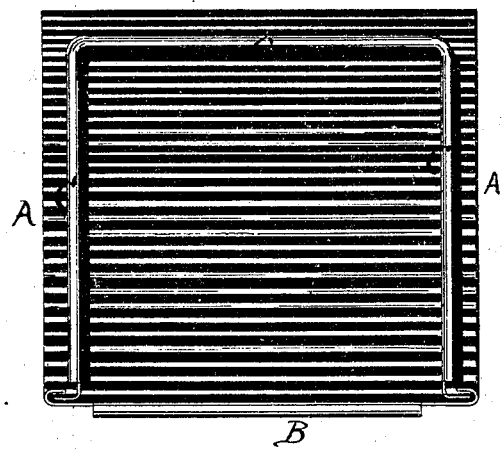
Fig. II
Witnesses:
A. C. Rawlings
D. W. Ellsworth
Inventor:
James W. Brook
By Hill & Ellsworth
His Attorneys

UNITED STATES PATENT OFFICE.

JAMES W. BROOK, OF LYNCHBURG, VIRGINIA.

IMPROVEMENT IN TRANSPLANTING DEVICES.

Specification forming part of Letters Patent No. 117,378, dated July 25, 1871.

*To all whom it may concern:*

Be it known that I, JAMES W. BROOK, of Lynchburg, in the county of Campbell and State of Virginia, have invented a new and Improved Transplanting Device; and I do hereby declare the following to be a full, clear, and exact description of the same, reference being had to the accompanying drawing forming part of this specification, in which—

Figure 1 is a perspective view of my improved transplanter partly open, and Fig. 2 is a plan of the same.

Similar letters of reference in the accompanying drawing indicate corresponding parts.

The devices heretofore employed for transplanting or removing plants from the propagating-bed to the field or garden have generally been so constructed that they are not applicable to tender vines, such as the cucumber, melon, cymling, and others having very short or few roots, but are used more particularly for tomato, cabbage, and other like plants which have roots enough to hold a sufficient quantity of soil to insure their growth after being transplanted. The unfitness of the ordinary transplanter for use with vines is due to the fact that it is usually made with an open top and bottom, to admit of its being pressed into the soil around the plant to be removed. Inasmuch, therefore, as the transplanting of delicate vines requires a suitable bottom support in order to hold the dirt about the roots of the plants, particularly in wet weather, the open device can only be employed with the more hardy plants having a greater quantity of roots to hold the dirt together.

My invention has for its object to provide a transplanter which is applicable to the most tender vines or plants, such as the cucumber, melon, cymling, &c., as well as to those of a more hardy nature; and to this end it consists in making the transplanter in two parts, one part constituting the bottom and one side, and the other forming the remaining sides, so that the bottom can be pushed into the soil under the plants and the remaining sides forced into the ground around the plant, thereby forming a case or box partly or wholly closed, in which the plant can be safely removed from the propagating-bed.

In the accompanying drawing, A is the bottom of my improved transplanter, and B the side attached to said bottom. C C C are the remaining sides, made separate from the part A B, as shown. The inner face of the side B is provided with vertical grooves *d* upon its edges, formed by bending said edges over, as shown, which grooves are adapted to receive vertical flanges *e*, formed upon the edges of the two opposite sides C C.

The operation of transplanting is as follows: The two parts of the device are first separated and a small recess or cavity formed in the soil upon one side of the plant to be removed. Into this recess the bottom A is placed in a horizontal position and forced into the soil immediately beneath the plant. The sides C C C are then placed around the plant, resting upon the surface of the soil, and with the lower ends of the flanges *e* just entering the upper ends of the grooves *d*. These sides are then forced into the soil until their lower edges touch the bottom B, being guided by the flanges and grooves. This operation completed, the plant is held in an inclosed box, and can be safely removed from place to place. The bottom B is, of course, made somewhat larger than the space between the sides C, so that the latter shall rest upon it when forced into the soil. The lower edges of such sides are made thin and sharp in order to admit of their being forced easily into the earth.

The transplanter may be constructed of any suitable material, but I prefer to use sheet metal, as being, perhaps, the most economical.

In applying the sides C their flanges *c* need not necessarily enter the grooves *d*, but may be held a short distance from such grooves. In this case, however, all the parts must be held together by hand. It is, of course, apparent that the transplanter may be made of any suitable size, and that the parts C B may be adapted for temporary union by any well-known means other than the flanges and grooves.

Having thus described my invention, what I claim as new therein, and desire to secure by Letters Patent, is—

1. A transplanting device, consisting of a detachable bottom to be forced into the earth under the plant, and one or more detachable sides to be forced downward into the earth around the plant and rest upon the detachable bottom, substantially as described, for the purpose specified.

2. The transplanting device, consisting of the detachable bottom and sides A B and the sliding sides C C C, all constructed to operate substantially as described, for the purpose specified.

JAMES W. BROOK.

Witnesses:
NATHAN K. ELLSWORTH,
A. C. RAWLINGS.